Oct. 10, 1961     R. C. CURTIS     3,004,257

NAVIGATION SYSTEM FOR AIRCRAFT

Filed May 31, 1955     2 Sheets-Sheet 1

3,004,257
NAVIGATION SYSTEM FOR AIRCRAFT
Richard C. Curtis, Old Westbury, N.Y., assignor to Hazeltine Research, Inc., Chicago, Ill., a corporation of Illinois
Filed May 31, 1955, Ser. No. 511,852
8 Claims. (Cl. 343—112)

*General*

This invention relates to navigation systems for aircraft and, more particularly, to such systems of the of the type which provides both distance and azimuth information to the aircraft.

There is presently in use with extensive equipment investment a VHF omnirange system (known as VOR) operating at a frequency of approximately 100 megacycles for supplying azimuth information to an unlimited number of aircraft. There is also in use with extensive equipment investment distance-measuring equipment (known as DME) operating at a frequency of approximately 1000 megacycles to provide information of the distance between any of several aircraft and a ground station. These omnirange and distance-measuring systems (together known as the "common system") have heretofore operated at widely spaced frequencies and with widely varying frequency spacings and, hence, they have involved greater circuit complexity than is desirable for some applications.

Recently, the United States Government had considered sacrificing the "common system" with its advantages and equipment investment and also at the cost of considerable change-over inconvenience, by changing over to a basically different system known as "TACAN."

The "TACAN" system transmits by signal bursts or pulses azimuth and distance information to challenging aircraft over a maximum of one-hundred twenty-six different frequency channels for interrogation and one-hundred twenty-six channels for reply. Each complete interrogation-reply channel is approximately 2 megacycles wide. Because of the large number of channels needed in a relatively small available frequency spectrum (approximately 255 megacycles in the band between 960 megacycles and 1215 megacycles), the 2-megacycle band width of each interrogation-reply frequency channel required to maintain all channels in the available frequency spectrum results in severe disadvantages. Thus, the transmitted pulses must be critically shaped with respect to rise and decay times in order not to interfere with adjacent channels. Moreover, the close channel spacing and band-width requirements necessitate small tolerances on transmitter and receiver frequency stability and receiver selectivity which are highly undesirable. Also, even with severely limited channel widths, this prior system requires much more frequency spectrum per channel than is desirable.

The situation thus far related has represented a major problem affected by many conflicting interests such as those of civilian flying and the armed services. To date all interested have assiduously sought improved solutions acceptable to all. Some of the requirements which must be met are:

(1) Any new system must fit a large number of channels into available spectrum gaps with adequate channel spacing and with a minimum reallocation of spectrum assignment.

(2) Surface equipment must be compact and small because of shipboard-site problems of the antenna and similar problems.

Also, I believe that it is highly desirable for any new system to be compatible with the present "common system," i.e., to be usable cooperatively with it and to provide an orderly transition from the "common system" to the new system as the "common system" is replaced over the years. Moreover, in view of the ever mounting demand for new channels (for coverage of low-altitude planes), it is highly desirable to provide a maximum number of channels occupying a minimum frequency spectrum even though more spectrum may be available at the moment. This also allows adequate channel spacing and a reduction of the tightness of tolerances on manufactured equipment.

Further, I believe I am the first to appreciate that by properly selecting operating frequencies for azimuth and distance channels while utilizing systems similar to VOR and DME but in close frequency proximity and with predetermined constant spacings between the ground DME frequencies and corresponding primary omnirange frequencies, circuit simplification in a single airborne receiver for both DME and omnirange can be provided. This frequency preselection, which I propose, will be more fully explained subsequently.

It is an object of the present invention, therefore, to provide a new and improved navigation system for aircraft which avoids one or more of the abovementioned disadvantages and limitations of prior such systems.

It is another object of the present invention to provide a new and improved navigation system for aircraft which is capable of providing distance and azimuth information to a large number of aircraft while occupying a minimum frequency spectrum.

It is another object of the present invention to provide a new and improved navigation system which is capable of providing distance and azimuth information over a large number of channels with adequate channel spacing and width which relieves the necessity for small tolerances on frequency stability and selectivity.

It is another object of the invention to provide a new and improved navigation system for aircraft which is capable of providing distance and azimuth information to a large number of aircraft with adequate channel spacing and width while occupying a minimum frequency spectrum.

It is another object of the present invention to provide a new and improved navigation system for aircraft which is capable of providing distance and azimuth information and which is compatible with the presently employed "common system."

It is another object of the present invention to provide a new and improved air navigation system of simplified construction and capable of translating distance and azimuth information.

In accordance with the invention, a multi-channel radio-navigation system for aircraft comprises a group of $m \cdot n$ or less geographically spaced ground stations each having its characteristic combination of challenging pulse code and challenging frequency and responsive to a received challenging signal at that frequency and pulse code to transmit a reply signal having a combination of one of $m$ reply pulse codes and one of $n$ reply frequencies also characteristic of the station and equipment at each station for transmitting one or more continuous wave signals affording additional information with respect to the station at one of $n$ frequencies also characteristic of the station. All of those stations which have an identical reply frequency have a characteristic continuous wave frequency spaced from that reply frequency by a small primary value $p$ plus a multiple from 0 to $m$ of a predetermined secondary increment $s$ approximately $p/m \cdot n$, the primary value $p$ of the spacing between reply and continuous wave frequencies being the same for all stations. The radio-navigation system also comprises a group of airborne apparatus each including a transmitter for transmitting one of the challenging signals and an airborne receiver including selector means selectively responsive to a reply signal of any of the ground stations for deriving a signal representative of the distance between it and a challenged ground station, additional selector means selectively responsive to the continuous wave signals of any of the ground stations for deriving a signal representative of such additional information from the ground station, and unicontrol means for adjusting both selector means in unison to respond only to the reply signal and the continuous wave signal from the same ground station where the foregoing parameters have the significance given below.

For a better understanding of the present invention, together with other and further objects thereof, reference is had to the following description taken in connection with the accompanying drawings, and its scope will be pointed out in the appended claims.

In the accompanying drawings.

Figure 1:
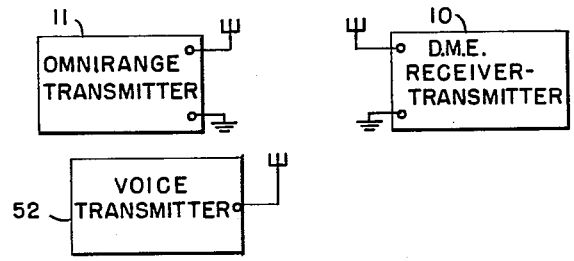
FIG. 1 is a schematic diagram of a typical ground station employed in the navigation system of the present invention.

Description of FIG. 1 ground station

Referring now more particularly to FIG. 1 of the drawings, the navigation system includes a group of $m\ n$ geographically spaced ground stations, such as the FIG. 1 station, each having its characteristic combination of challenging pulse code and challenging frequency and responsive to a received challenging signal at that frequency and pulse code to transmit a reply signal having a combination of one of $m$ reply pulse codes and one of $n$ reply frequencies also characteristic of the station, where $m$ and $n$ are any selected integers. Groups of these stations have identical reply frequencies. For example, there may be twenty groups of ten stations having twenty reply frequencies in the vicinity of 1200 megacycles and spaced from each other by 2.5 megacycles, as will be explained in greater detail subsequently, in which case $m=10$ and $n=20$ and there are two hundred ground stations. The FIG. 1 ground station includes a distance-measuring equipment (DME) receiver-transmitter 10 which may be of conventional construction, for example, of the type described in an article by Charles J. Hirsch entitled, "Pulse-Multiplex System for Distance-Measuring Equipment (DME)" in the November 1949 issue of the Proceedings of the IRE.

The navigation system also includes equipment at each station for transmitting one or more continuous wave signals affording additional information with respect to the station at one of $n$ frequencies also characteristic of this station. This equipment is effective to transmit, for example, a pair of signals jointly representing the azimuth information and having a frequency spaced from the reply frequency of the DME receiver-transmitter 10 by a small primary value $p$ plus a multiple from 0 to $m$ of a predetermined secondary increment $s$ approximately equal to $p/m\ n$, the primary value $p$ of the spacing between the reply and continuous wave frequencies being the same for all stations.

The equipment just described comprises an omnirange transmitter 11 which may be of generally similar construction to omnirange transmitters now in use and operating at 100 megacycles with the exception that the omnirange transmitter 11 is designed to operate at a much higher frequency of, for example, approximately 1100 megacycles. One type of 100-megacycle omnirange transmitting and receiving equipment is described in an article entitled "The Civil Aeronautics Administration VHF Omnirange," by Hurley, Anderson, and Keary, Proceedings of the IRE, December 1951. The operating frequency of the transmitter 11 preferably is spaced by less than 100 megacycles from the frequency of the DME reply signal transmitted by unit 10. The omnirange transmitter 11 transmits azimuth information and, thus, the ground station comprises a complete system for transmitting in the frequency range of approximately 1100–1200 megacycles both distance and azimuth information.

I propose to operate the foregoing equipment in a system which may, for example, employ the following frequency allocation of channels each having an equivalent width of 0.25 megacycles, i.e., 2.5 megacycles for a group of ten pulse-coded DME interrogation channels, 2.5 megacycles for a group of ten DME reply channels, and 2.5 megacycles for a group of ten omnirange azimuth channels. Since this adds up to only 150 megacycles for two hundred stations, it is apparent that much spectrum space is still available in the 960 to 1215 megacycle band for other uses or future increases in the number of channels if needed. Thus, a voice transmitter 52 (or other data transmitter) may be employed at the ground station for transmitting a continuous wave signal carrying voice or data information. The continuous wave frequencies of the voice transmitters at all the ground stations may be spaced by the same value $q$ from the continuous wave frequencies of the corresponding omnirange transmitters to provide simplified selection by the airborne receiver. The frequencies which I propose as an illutsrative example are set forth in the following table.

| 200 DME Interrogation Channels | | 200 Omnirange Azimuth Channels | |
|---|---|---|---|
| Megacycles | | Megacycles | |
| 963.5– 988.5<br>966.0– 991.0<br>968.5– 993.5<br>971.0– 996.0<br>973.5– 998.5<br>976.0–1,001.0<br>978.5–1,003.5<br>981.0–1,006.0<br>983.5–1,008.5<br>986.0–1,011.0 | ten pulse codes for each frequency. | 1,111.5–1,136.5<br>1,114.0–1,139.0<br>1,116.5–1,141.5<br>1,119.0–1,144.0<br>1,121.5–1,146.5<br>1,124.0–1,149.0<br>1,126.5–1,151.5<br>1,129.0–1,154.0<br>1,131.5–1,156.5<br>1,134.0–1,159.0 | twenty primary frequencies; nine secondary frequencies are spaced above each primary frequency by increments in multiples of .25 mc. |

| 200 DME Reply Channels | | 200 Voice or Data Channels | |
|---|---|---|---|
| Megacycles | | Megacycles | |
| 1,163.5–1,188.5<br>1,166.0–1,191.0<br>1,168.5–1,193.5<br>1,171.0–1,196.0<br>1,173.5–1,198.5<br>1,176.0–1,201.0<br>1,178.5–1,203.5<br>1,181.0–1,206.0<br>1,183.5–1,208.5<br>1,186.0–1,211.0 | ten pulse codes for each frequency. | 1,041.0–1,066.0<br>1,043.5–1,068.5<br>1,046.0–1,071.0<br>1,048.5–1,073.5<br>1,051.0–1,076.0<br>1,053.5–1,078.5<br>1,056.0–1,081.0<br>1,058.5–1,083.5<br>1,061.0–1,086.0<br>1,063.5–1,088.5 | twenty primary frequencies; nine secondary frequencies are spaced above each primary frequency by increments in multiples of .25 mc. |

Thus, with the frequency assignments specified in the foregoing table, the several parameters used above have the following values and definitions:

$m=10=$ the number of ground station interrogation channels in a group interrogated on the same frequency but on different codes
 $=$ the number of reply channel frequencies and the number of omnirange and voice or data primary frequency channels in a group $n=20=$ the number of groups of ground station interrogation channels transmitting on different frequencies
 $=$ the number of reply channel frequencies and the number of omnirange primary frequencies and voice or data channel primary frequencies $p=52$ mc.$=$ the frequency separation between each reply frequency and its associated omnirange primary frequency $q = 70.5$ mc. = the frequency separation between each omnirange primary frequency and its associated voice or data primary frequency $s = 0.25$ mc. = approximately $p/m\ n$
 = the frequency separation between omnirange secondary frequencies and voice or data channel secondary frequencies.

The assignments of interrogation, reply, azimuth, and voice channels from this chart to the ground stations are such that each ground station receives a preselected pulse code on one of the DME interrogation channels, transmits a preselected pulse code on a predetermined DME reply channel, transmits azimuth information on an omnirange azimuth channel paired with the DME reply channel 49.75–52 megacycles below the reply channel and transmits voice information on a voice channel 70.5 megacycles below the omnirange azimuth channel. The ten pulse-code channels associated with each DME reply frequency would preferably be paired respectively with the primary and nine secondary azimuth frequency channels, and with the primary and nine secondary voice-data frequency channels. For example, ground stations at ten cities might be assigned to operate as follows:

|  | City #1 | City #2 | City #3 | City #4 | City #5 |
|---|---|---|---|---|---|
| DME _____ mc__ | 963.5 | 966.0 | 968.5 | 971.0 | 973.5. |
| Interrogation _____ | Code #A$_i$ | Code #B$_i$ | Code #C$_i$ | Code #D$_i$ | Code #E$_i$. |
| DME _____ mc__ | 1,188.5 | 1,188.5 | 1,188.5 | 1,188.5 | 1,188.5. |
| Reply _____ | Code #A$_r$ | Code #B$_r$ | Code #C$_r$ | Code #D$_r$ | Code #E$_r$. |
| Azimuth _____ mc__ | 1,136.5 | 1,136.75 | 1,137.0 | 1,137.25 | 1,137.5. |
| Voice _____ mc__ | 1,066.0 | 1,066.25 | 1,066.5 | 1,066.75 | 1,067.0. |

|  | City #6 | City #7 | City #8 | City #9 | City #10 |
|---|---|---|---|---|---|
| DME _____ mc__ | 976 | 978.5 | 981 | 983.5 | 986. |
| Interrogation _____ | Code #F$_i$ | Code #G$_i$ | Code #H$_i$ | Code #I$_i$ | Code #J$_i$. |
| DME _____ mc__ | 1,188.5 | 1,188.5 | 1,188.5 | 1,188.5 | 1,188.5. |
| Reply _____ | Code #F$_r$ | Code #G$_r$ | Code #H$_r$ | Code #I$_r$ | Code #J$_r$. |
| Azimuth _____ mc__ | 1,137.75 | 1,138.0 | 1,138.25 | 1,138.5 | 1,138.75. |
| Voice _____ mc__ | 1,067.25 | 1,067.5 | 1,067.75 | 1,068.0 | 1,068.25. |

This arrangement would be repeated for succeeding groups of ten cities except that all DME reply azimuth and voice frequencies would be stepped up by 2.5 megacycles and different interrogation frequency-code combinations employed.

Since the azimuth frequencies are set up on the basis of twenty primary frequencies each 52 megacycles below the twenty DME reply channels and nine secondary frequencies formed by adding to the primary frequencies up to nine .25 megacycle increments, this arrangement results in a considerable economy of crystals in the airborne receiver since twenty crystals can thereby be made to cover the first heterodyning of the entire two hundred operational channels in the omnirange azimuth part of the apparatus and the two hundred voice channels together with the two hundred operational channels in the DME part of the apparatus. Ten additional crystals in the azimuth or voice channel then can be employed to provide the final frequency selection for all received frequencies.

From the foregoing description it will be understood that all of those stations which have an identical reply frequency have a characteristic continuous wave frequency spaced from the reply frequency by a small primary value of, for example, 52 megacycles plus a predetermined secondary increment of, for example, 0, .25, .50 . . . 2.25 megacycles which is less than the 2.5 megacycle spacing between adjacent reply frequencies. The primary spacing of 52 megacycles between reply and continuous wave frequencies is the same for all stations.

Figure 2:
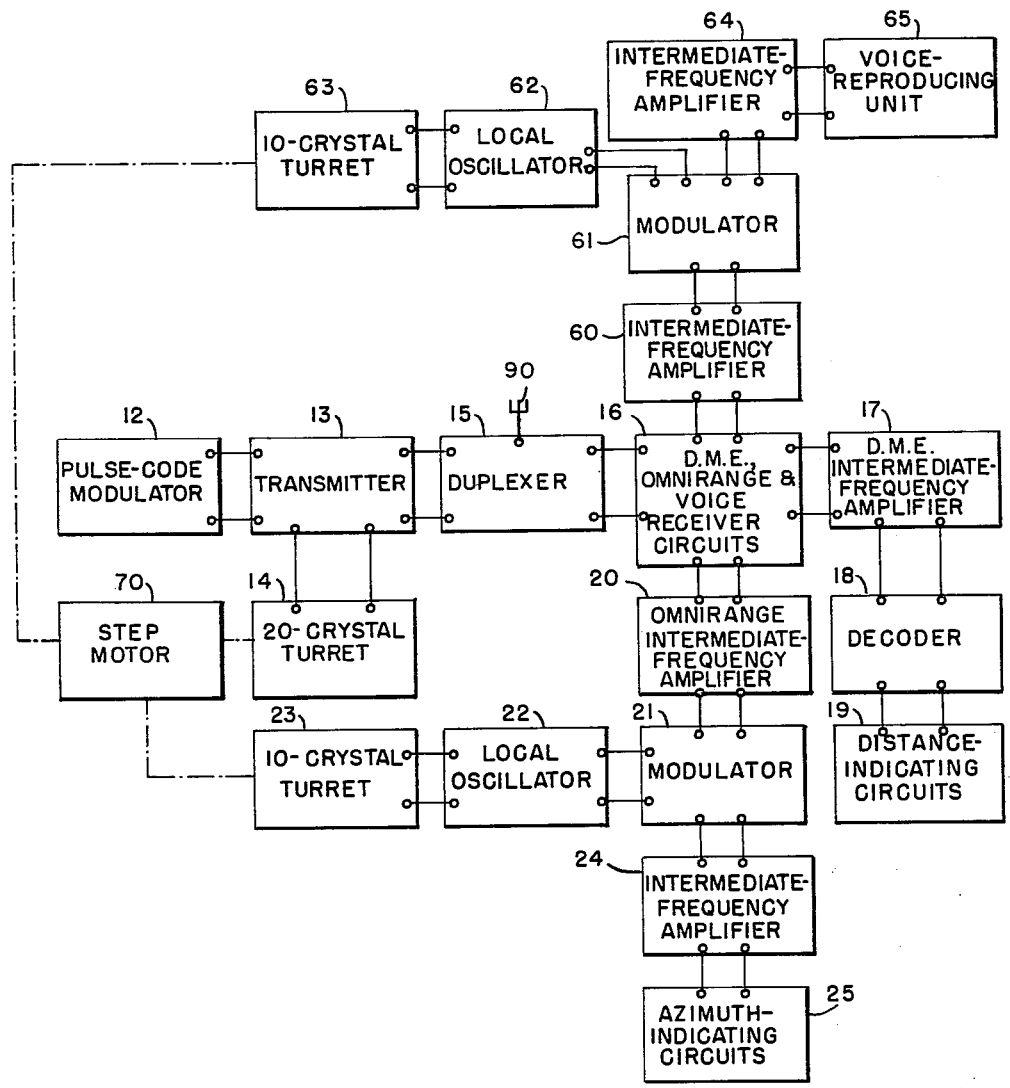
FIG. 2 is a schematic diagram of airborne interrogator and receiver equipment employed in the navigation system of the present invention.

*Description of FIG. 2 airborne equipment*

Referring now more particularly to FIG. 2 of the drawings, the navigation system also includes airborne transmitters for transmitting the previously mentioned pulse-coded challenging signals in accordance with the present DME practice. Each transmitter equipment includes, for example, a pulse-code modulator 12, coupled to a transmitter 13. There is also provided, for example, a twenty-crystal turret 14 for controlling the frequency of the transmitter 13. The output circuit of the transmitter 13 is coupled to an antenna 90 through a duplexer 15 of conventional construction for isolating the receiver circuits from the transmitter during the transmission intervals.

The airborne equipment also includes a receiver with each transmitter and responsive to the reply signal from the DME transmitter 10 for deriving a signal representative of the distance between the DME transmitter 10 and the aircraft and responsive to the continuous wave signals transmitted by the omnirange transmitter 11 for deriving a signal representing the azimuth of the aircraft with respect to the omnirange transmitter 11. This receiver equipment preferably comprises the antenna 90, duplexer 15, and DME and omnirange receiver circuits 16 for translating the DME and omnirange signals in a manner more fully described subsequently. The receiver equipment preferably also includes a DME intermediate-frequency amplifier 17 and decoder and distance-indicating circuits 18 and 19. Units 18 and 19 may be of similar construction to circuits described in the Hirsch article.

The receiver equipment preferably also includes an omnirange intermediate-frequency amplifier 20 coupled between the unit 16 and a modulator 21. A local oscillator 22 tuned by means of, for example, a ten-crystal turret 23 is also coupled to an input circuit of the modulator 21 for supplying a heterodyne signal thereto. The output circuit of the modulator 21 is coupled through an intermediate-frequency amplifier 24 to azimuth indicating circuits 25 of conventional construction. The azimuth indicating circuits 25 may be of a type similar to the circuits employed in the omnirange receiver described in the above-mentioned article by Hurley, Anderson, and Keary.

The receiver equipment preferably also includes a voice or data channel or a channel for a multiplexed combination of voice and data comprising an intermediate-frequency amplifier 60 coupled between the unit 16 and a modulator 61. A local oscillator 62 tuned by means of, for example, a ten-crystal turret 63 is also coupled to an input circuit of the modulator 61 for supplying a heterodyne signal thereto. The output circuit of the modulator 61 is coupled through an intermediate-frequency amplifier 64 to voice-reproducing unit 65 of conventional construction.

Figure 3:
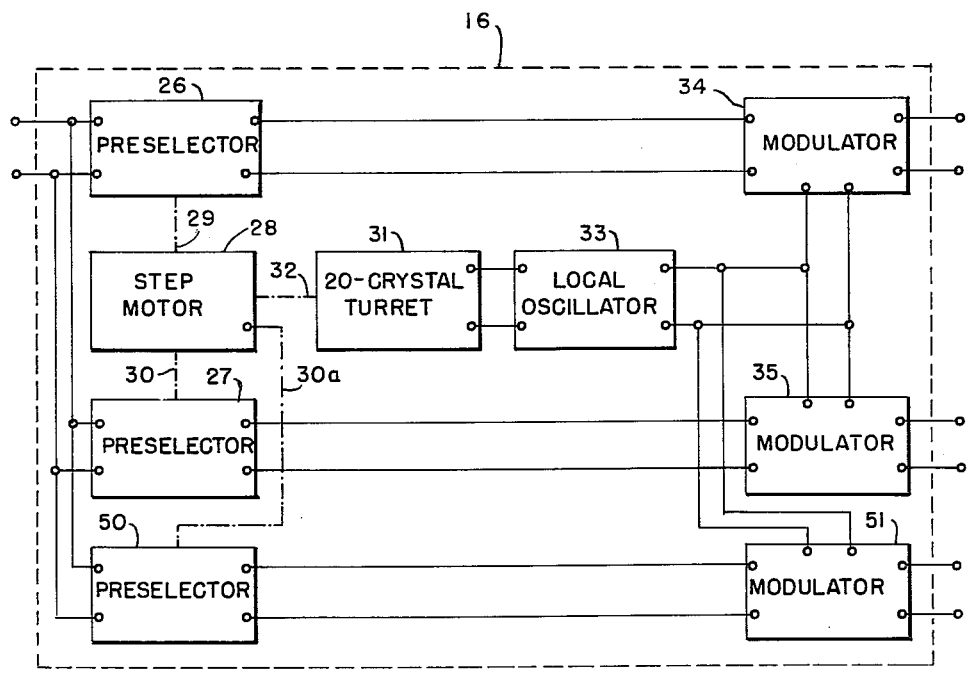
FIG. 3 is a schematic diagram of a portion of the FIG. 2 receiver.

*Description of FIG. 3 receiver circuits*

Referring now more particularly to FIG. 3 of the drawings, the unit 16 preferably comprises three preselectors 26, 27, 50 broadly tuned by means of a step motor 28. The mechanical connections between the motor 28 and the preselectors are represented by broken lines 29, 30, 30a. The motor 28 also is connected to, for example, a twenty-crystal turret 31, as indicated by broken line 32, to control the frequency of a local oscillator 33 for supplying a heterodyne signal having a frequency between the frequencies of the distance-measuring and azimuth signals intercepted by the antenna system 90.

The receiver equipment also includes modulators 34, 35 individually coupled to the preselectors 26, 27 and connected to the local oscillator 33 for deriving in the output circuit of the modulator 34 a signal representing the pulse-coded DME reply signal and for deriving in the output circuit of the modulator 35 an intermediate-frequency signal representing the transmitted omnirange continuous wave signals and which is, in turn, heterodyned in the modulator 21 of FIG. 2 to develop a signal of constant intermediate frequency representing the continuous wave signals for any of the received continuous wave frequencies. A modulator 51 is connected to the preselector 50 and to the local oscillator 33 and is effective to derive an intermediate-frequency signal representing the voice or data signal transmitted from the ground station.

*Operation of navigation system*

Assuming now that the aircraft carrying the FIG. 2 equipment is in the range of the FIG. 1 ground station and that the frequency of the transmitter 13 determined by the twenty-crystal turret 14, for example 963.5 megacycles, and the pulse code of the transmitter determined by the pulse-code modulator 12 are properly selected to challenge the FIG. 1 ground station, the interrogation signal transmitted by the airborne equipment causes a coded DME reply signal to be transmitted by the unit 10 of FIG. 1 at a frequency of, for example, 1188.5 megacycles. Meanwhile, the omnirange transmitter 11 transmits a pair of continuous wave signals at a frequency of, for example 1136.5 megacycles. One of these signals carries a frequency-modulation reference signal while the other is transmitted with a rotating pattern which effectively develops an amplitude-modulated signal carrier at any given point in space in a manner similar to conventional omnirange transmission practice. The voice transmitter 52 transmits a signal carrying voice or other modulation information at a frequency of, for example, 1066 megacycles. The DME reply signal, the omnirange signals, and the voice signal are intercepted by the antenna 90 and applied through duplexer 15 to the DME and omnirange receiver circuits 16 of FIG. 2.

Referring now more particularly to FIG. 3, the intercepted signals are applied to the preselectors 26, 27, and 50 which preferably are automatically tuned to the proper frequency bands by the step motor 28 when the airborne transmitter interrogation channel (pulse code and frequency) are selected. At that time, the step motor 28 also selects the proper operating frequency of the local oscillator 33 by control of the twenty-crystal turret 31. The intercepted signals beat in the modulators 34 and 35 with the local oscillator output signal to derive in the modulator 34 the DME reply signal at an intermediate frequency of, for example, 26 megacycles to derive in the modulator 35 at an intermediate frequency of, for example, 26 megacycles the azimuth signal and to derive the voice signal in the modulator 51 at an intermediate frequency of, for example, 96.5 megacycles. The DME reply signal is applied by the modulator 34 to the intermediate-frequency amplifier 17 where it is amplified and applied to decoder 18. Decoder 18 then actuates the distance-indicating circuits in a conventional manner.

The azimuth signals are applied by modulator 35 to the amplifier 20 which amplifies the same for application to the modulator 21. The local oscillator 22 supplies to the modulator 21 a heterodyne signal having a frequency adjustable in .25 megacycle steps as determined by the ten-crystal turret 23, to derive an intermediate-frequency signal of constant frequency for amplification in the intermediate-frequency amplifier 24 which serves as a frequency-selective repeater capable of distinguishing between adjacent omnirange channels spaced by .25 megacycle. The proper crystal preferably is automatically selected by step motor 70 when the interrogation frequency is selected. The output signal of the intermediate-frequency amplifier 24 provides an azimuth indication in unit 25 in a conventional manner. Thus, when turret 14 and modulator 12 are set to a given interrogation channel, oscillator 33 is automatically tuned to derive the proper DME intermediate frequency for the one of the two hundred DME reply channels paired with the interrogation channel at the same time that oscillator 33 and oscillator 22 together automatically derive the proper omnirange azimuth intermediate frequency for that one of the two hundred omnirange channels paired with the selected DME reply channel.

In a similar manner the local oscillator 62 supplies to the modulator 61 a heterodyne signal having a frequency adjustable in .25 megacycle steps as determined by the ten-crystal turret 63 to derive an intermediate-frequency signal of constant frequency for amplification in the intermediate-frequency amplifier 64. The proper crystal preferably is automatically selected by step motor 70 when the interrogation frequency is selected. The output signal of the intermediate-frequency amplifier 64 is applied to unit 65 which reproduces sound in a conventional manner.

With the foregoing I have brought the following advantages together into a single system:

*Compatibility.*—With my system the DME part of the "common system" need not be abandoned as contemplated; it is incorporated bodily as an element of my system. Moreover, those who wish may also continue to use the omnirange portion of the "common system," shifting over to my system as equipment becomes obsolete or even now by relatively less expensive equipment changes.

*Equipment Economy.*—Many factors contribute to this. The close proximity of the frequencies in the DME and omnirange circuits and the proper selection of frequency spacings permits dual use of parts for the distance and azimuth functions. The broader tolerances considerably reduce cost. Lesser requirements for crystals result in much saving.

*Spectrum Economy.*—The possibility of many more operating ground stations has been indicated above because of the roughly 60 percent reduction in the spectrum requirements of "TACAN." It is even possible to provide as many ground stations as "TACAN" and still have unmolested other spectrum assignments presently within the 960 to 1215 megacycle band.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A multichannel radio-navigation system for aircraft comprising: a group of $m\ n$ or less geographically spaced ground stations each having its characteristic combination of challenging pulse code and challenging frequency and responsive to a received challenging signal at that frequency and pulse code to transmit a reply signal having a combination of one of $m$ reply pulse codes and one of $n$ reply frequencies also characteristic of the station; equipment at each station for transmitting one or more continuous wave signals affording additional information with respect to the station at one of $n$ frequencies also characteristic of the station, all of those stations which have an identical reply frequency having a characteristic continuous wave frequency spaced from that reply frequency by a small primary valve $p$ plus a multiple from 0 to $m$ of a predetermined secondary increment $s$ approximately $p/m\ n$, the primary value $p$ of the spacing between reply and continuous wave frequencies being the same for all stations; and a group of airborne apparatus each including a transmitter for transmitting one of said challenging signals and an airborne receiver including selector means selectively responsive to a reply signal of any of said ground stations for deriving a signal representative of the distance between it and a challenged ground station, additional selector means selectively responsive to the continuous wave signals of any of said ground stations for deriving a signal representative of said additional information from the ground station, and unicontrol means for adjusting said selector means in unison to respond only to the reply signal and the continuous wave signal from the same ground station where the foregoing parameters have the significance given in the specification.

2. A multichannel radio-navigation system for aircraft comprising: a group of 200 or less geographically spaced ground stations each having its characteristic combination of challenging pulse code and challenging frequency and responsive to a received challenging signal at that frequency and pulse code to transmit a reply signal having a combination of one of 10 reply pulse codes and one of 20 reply frequencies also characteristic of the station; equipment at each station for transmitting one or more continuous wave signals affording additional information with respect to the station at one of 20 frequencies also characteristic of the station, all of those stations which have an identical reply frequency having a characteristic continuous wave frequency spaced from that reply frequency by a small primary value $p$ plus a multiple from 0 to 10 of a predetermined secondary increment $s$ approximately $p/200$, the primary value $p$ of the spacing between reply and continuous wave frequencies being the same for all stations; and a group of airborne apparatus each including a transmitter for transmitting one of said challenging signals and an airborne receiver including selector means selectively responsive to a reply signal of any of said ground stations for deriving a signal representative of the distance between it and a challenged ground station, additional selector means selectively responsive to the continuous wave signals of any of said ground stations for deriving a signal representative of said additional information from the ground station, and unicontrol means for adjusting said selector means in unison to respond only to the reply signal and the continuous wave signal from the same ground station where the foregoing parameters have the significance given in the specification.

3. A multichannel radio-navigation system for aircraft comprising: a group of $m\ n$ geographically spaced ground stations each having its characteristic combination of challenging pulse code and challenging frequency and responsive to a received challenging signal at that frequency and pulse code to transmit a reply signal having a combination of one of $m$ reply pulse codes and one of $n$ reply frequencies also characteristic of the station; equipment at each station for transmitting a continuous wave signal affording azimuth information with respect to the station at one of $n$ frequencies also characteristic of the station, all of those stations which have an identical reply frequency having a characteristic continuous wave frequency spaced from that reply frequency by a small primary value $p$ plus a multiple from 0 to $m$ of a predetermined secondary increment $s$ approximately $p/m\ n$, the primary value $p$ of the spacing between reply and continuous wave frequencies being the same for all stations; equipment at each station for transmitting a continuous wave signal affording voice communication with the station at one of $n$ frequencies also characteristic of the station, all of those stations which have an identical reply frequency also having a characteristic continuous wave frequency spaced from that reply frequency by a primary value $q$ larger than $p$ plus a multiple from 0 to $m$ of said secondary increment $s$, the primary value $q$ of the spacing between reply and continuous wave frequencies being the same for all stations; and a group of airborne apparatus each including a transmitter for transmitting one of said challenging signals and an airborne receiver including selector means selectively responsive to a reply signal of any of said ground stations for deriving a signal representative of the distance between it and a challenged ground station, additional selector means selectively responsive to the azimuth-representative continuous wave signals of any of said ground stations for deriving a signal representative of the azimuth of the ground station, additional selector means selectively responsive to the communication continuous wave signals of any of said ground station for deriving a voice signal from the ground station; and unicontrol means for adjusting all said selector means in unison to respond only to the reply signal and the continuous wave signals from the same ground station where the foregoing parameters have the significance given in the specification.

4. A multichannel radio-navigation system for aircraft comprising: a group of 200 or less geographically spaced ground stations each having its characteristic combination of challenging pulse code and challenging frequency and responsive to a received challenging signal at that frequency and pulse code to transmit a reply signal having a combination of one of 10 reply pulse codes and one of 20 reply frequencies also characteristic of the station; equipment at each station for transmitting a continuous wave signal affording azimuth information with respect to the station at one of 20 frequencies also characteristic of the station, all of those stations which have an identical reply frequency having a characteristic continuous wave frequency spaced from that reply frequency by a small primary value $p$ plus a multiple from 0 to 10 of a predetermined secondary increment $s$ approximately $p/200$, the primary value $p$ of the spacing between reply and continuous wave frequencies being the same for all stations; equipment at each station for transmitting a continuous wave signal affording voice communication with the station at one of 20 frequencies also characteristic of the station, all of those stations which have an identical reply frequency spaced from that reply frequency by a primary value $q$ larger than $p$ plus a multiple from 0 to 10 of said secondary increment $s$, the primary value $q$ of the spacing between reply and continuous wave frequencies being the same for all stations; and a group of airborne apparatus each including a transmitter for transmitting one of said challenging signals and an airborne receiver including selector means selectively responsive to a reply signal of any of said ground stations for deriving a signal representative of the distance between it and a challenged ground station, additional selector means selectively responsive to the azimuth-representative continuous wave signals of any of said ground stations for deriving a signal representative of the azimuth of the ground station, additional selector means selectively responsive to the communication continuous wave signals of any of said ground stations for deriving a voice signal from the ground station; and unicontrol means for adjusting all said selector means in unison to respond only to the reply signal and the continuous wave signals from the same ground station where the foregoing parameters have the significance given in the specification.

5. In a multichannel radio-navigation system for aircraft including a group of $m\ n$ or less geographically spaced ground stations each having its characteristic combination of challenging pulse code and challenging frequency and responsive to a received challenging signal at that frequency and pulse code to transmit a reply signal having a combination of one of $m$ reply pulse codes and one of $n$ reply frequencies also characteristic of the station and including equipment at each station for transmitting one or more continuous wave signals affording additional information with respect to the station at one of $n$ frequencies also characteristic of the station, all of those stations which have an identical reply frequency having a characteristic continuous wave frequency spaced from that reply frequency by a small primary value $p$ plus a multiple from 0 to $m$ of a predetermined secondary increment $s$ approximately $p/m\ n$, the primary value $p$ of the spacing between reply and continuous wave frequencies being the same for all stations, an airborne apparatus comprising: a transmitter for transmitting one of said challenging signals; an airborne receiver including selector means selectively responsive to a reply signal of any of said ground stations for deriving a signal representative of the distance between it and a challenged ground station, additional selector means selectively responsive to the continuous wave signals of any of said ground stations at frequencies individually spaced from said reply frequencies by a value $p$ plus a multiple from 0 to $m$ of $s$ for deriving a signal representative of said additional information from the ground station, and unicontrol means for adjusting said selector means in unison to respond only to the reply signal and the continuous wave signal from the same ground station where the foregoing parameters have the significance given in the specification.

6. In a multichannel radio-navigation system for aircraft including a group of $m\ n$ or less geographically spaced ground stations each having its characteristic combination of challenging pulse code and challenging frequency and responsive to a received challenging signal at that frequency and pulse code to transmit a reply signal having a combination of one of $m$ reply pulse codes and one of $n$ reply frequencies also characteristic of the station and including equipment at each station for transmitting a continuous wave signal affording azimuth information with respect to the station at one of $n$ frequencies also characteristic of the station, all of those stations which have an identical reply frequency having a characteristic continuous wave frequency spaced from that reply frequency by a small primary value $p$ plus a multiple from 0 to $m$ of a predetermined secondary increment $s$ approximately $p/m\ n$, the primary value $p$ of the spacing between reply and continuous wave frequencies being the same for all stations, and including equipment at each station for transmitting a continuous wave signal affording voice communication with the station at one of $n$ frequencies also characteristic of the station, all of those stations which have an identical reply frequency also having a characteristic continuous wave frequency spaced from that reply frequency by a primary value $q$ larger than $p$ plus a multiple from 0 to $m$ of said secondary increment $s$, the primary value $q$ of the spacing between reply and continuous wave frequencies being the same for all stations, an airborne apparatus comprising: a transmitter for transmitting one of said challenging signals; an airborne receiver including selector means selectively responsive to a reply signal of any of said ground stations for deriving a signal representative of the distance between it and a challenged ground station, additional selector means selectively responsive to the azimuth-representative continuous wave signals of any of said ground stations at frequencies individually spaced from said reply frequencies by a value $p$ plus a multiple from 0 to $m$ of $s$ for deriving a signal representative of the azimuth of the ground station, additional selector means selectively responsive to the communication continuous wave signals of any of said ground stations at frequencies individually spaced from said reply frequencies by a value $q$ plus a multiple from 0 to $m$ of $s$ for deriving a voice signal from the ground station; and unicontrol means for adjusting all said selector means in unison to respond only to the reply signal and the continuous wave signals from the same ground station where the foregoing parameters have the significance given in the specification.

7. In a multichannel radio-navigation system for aircraft including a group of $m\ n$ or less geographically spaced ground stations each having its characteristic combination of challenging pulse code and challenging frequency and responsive to a received challenging signal at that frequency and pulse code to transmit a reply signal having a combination of one of $m$ reply pulse codes and one of $n$ reply frequencies also characteristic of the station and including equipment at each station for transmitting one or more continuous wave signals affording additional information with respect to the station at one of $n$ frequencies also characteristic of the station, all of those stations which have an identical reply frequency having a characteristic continuous wave frequency spaced from that reply frequency by a small primary value $p$ plus a multiple from 0 to $m$ of a predetermined secondary increment $s$ approximately $p/m\ n$, the primary value $p$ of the spacing between reply and continuous wave frequencies being the same for all stations, an airborne apparatus comprising: a transmitter for transmitting one of said challenging signals; an airborne receiver including selector means selectively responsive to a reply signal of any of said ground stations for deriving a signal representative of the distance between it and a challenged ground station, additional selector means selectively responsive to the continuous wave signals of any of said ground stations at frequencies individually spaced from said reply frequencies by a value $p$ plus a multiple from 0 to $m$ of $s$ for deriving a signal representative of said additional information from the ground station, a pair of first modulators individually coupled to said selector means; a single heterodyne oscillator coupled to said modulators; and unicontrol means for adjusting said selector means and said oscillator in unison to respond only to the reply signal and the continuous wave signal from the same ground station and to develop intermediate-frequency signals representative of said continuous wave signals which are of the same frequency for all ground stations where the foregoing parameters have the significance given in the specification.

8. In a multichannel radio-navigation system for aircraft including a group of $m\ n$ or less geographically spaced ground stations each having its characteristic combination of challenging pulse code and challenging frequency and responsive to a received challenging signal at that frequency and pulse code to transmit a reply signal having a combination of one of $m$ reply pulse codes and one of $n$ reply frequencies also characteristic of the station and including equipment at each station for transmitting one or more continuous wave signals affording additional information with respect to the station at one of $n$ frequencies also characteristic of the station, all of those stations which have an identical reply frequency having a characteristic continuous wave frequency spaced from that reply frequency by a small primary value $p$ plus a multiple from 0 to $m$ of a predetermined secondary increment $s$ approximately $p/m\ n$, the primary value $p$ of the spacing between reply and continuous wave frequencies being the same for all stations, an airborne apparatus comprising: a transmitter for transmitting one of said challenging signals; an airborne receiver including selector means selectively responsive to a reply signal of any of said ground stations for deriving a signal representative of the distance between it and a challenged ground station, additional selector means selectively responsive to the continuous wave signals of any of said ground stations at frequencies individually spaced from said reply frequencies by a value $p$ plus a multiple from 0 to $m$ of $s$ for deriving a signal representative of said additional information from the ground station, a pair of first modulators individually coupled to said selector means; a first single heterodyne oscillator coupled to said modulators; a second modulator coupled to the continuous wave signal modulator; a second heterodyne oscillator coupled to said second modulator; and unicontrol means for adjusting said selector means and said first oscillator in unison in $n$ frequency steps of $p$ spacing to respond only to the reply signal and the continuous wave signal from the same ground station and to develop intermediate-frequency signals representative of said continuous wave signals which are of the same frequency for all ground stations and for adjusting said second oscillator in $m$ frequency steps of $s$ spacing, whereby said receiver selectively receives signals of any of $m$ $n$ frequencies by the use of $m$ plus $n$ oscillator frequency-determining elements where the foregoing parameters have the significance given in the specification.

References Cited in the file of this patent

UNITED STATES PATENTS

| | | |
|---|---|---|
| 2,480,123 | Deloraine et al. | Aug. 30, 1949 |
| 2,653,314 | Litchford | Sept. 22, 1953 |